United States Patent [19]
Tanaka et al.

[11] Patent Number: 5,663,936
[45] Date of Patent: Sep. 2, 1997

[54] MAGNETO-OPTIC RECORDING MEDIUM SUITED FOR MARK EDGE RECORDING SYSTEM AND HAVING MAGNETIC LAYER MADE OF COMPOSITION MODULATED MATERIAL

[75] Inventors: Tsutomu Tanaka; Haruhiko Izumi; Tomonori Ikeya; Keiji Shono, all of Kawasaki, Japan

[73] Assignee: Fujitsu Limited, Kawasaki, Japan

[21] Appl. No.: 444,541

[22] Filed: May 19, 1995

Related U.S. Application Data

[63] Continuation of Ser. No. 222,946, Apr. 5, 1994, abandoned.

[30] Foreign Application Priority Data

Sep. 2, 1993 [JP] Japan ................. 5-218708

[51] Int. Cl.$^6$ ................................ G11B 11/00
[52] U.S. Cl. ................ 369/13; 369/288; 428/694 SC
[58] Field of Search .................. 369/13, 275.1, 369/275.2, 275.3, 275.4, 288, 14; 360/131, 135, 59, 114; 365/122; 428/694 SC, 694 LE, 694 MM, 694 EC, 694 RL

[56] References Cited

U.S. PATENT DOCUMENTS

| | | | |
|---|---|---|---|
| 4,801,499 | 1/1989 | Aoyama et al. | 369/13 X |
| 4,871,614 | 10/1989 | Kobayashi | 369/13 X |
| 4,882,231 | 11/1989 | Aratani | 428/611 |
| 5,168,482 | 12/1992 | Aratani et al. | 369/13 |
| 5,248,565 | 9/1993 | Tsutsumi et al. | |
| 5,325,345 | 6/1994 | Shimokawato et al. | 369/13 |
| 5,400,307 | 3/1995 | Ochiai et al. | 369/13 |

FOREIGN PATENT DOCUMENTS

| | | |
|---|---|---|
| 0 051 296 | 5/1982 | European Pat. Off. . |
| 0 330 394 | 8/1989 | European Pat. Off. . |
| 0449183 | 10/1991 | European Pat. Off. . |
| 0482606 | 4/1992 | European Pat. Off. . |
| 57-78652 | 5/1982 | Japan . |
| 63-222351 | 9/1988 | Japan . |
| 1-237945 | 9/1989 | Japan . |
| 3-237635 | 10/1991 | Japan . |

OTHER PUBLICATIONS

Patent Abstracts of Japan, vol. 7, No. 168 (P–212), Jul. 27, 1983, & JP-A-58 073 030.
Derwent Publications Ltd., Week 8603, AN 86–018766 & JP-A-60 243 840, Dec. 3, 1985.

*Primary Examiner*—Ali Neyzari
*Attorney, Agent, or Firm*—Armstrong, Westerman, Hattori, McLeland & Naughton

[57] ABSTRACT

A magneto-optic recording medium with a transparent substrate, a first dielectric layer above the transparent substrate, a magnetic layer above the first dielectric layer, a second dielectric layer above the magnetic layer, and a reflecting layer above the second dielectric layer. The magnetic layer is made of a composition modulated material.

11 Claims, 11 Drawing Sheets

FIG. 3A

| LIGHT INCIDENT SIDE | OPPOSITE SIDE |
|---|---|
| $Gd_{23}(Fe_{80}Co_{20})_{77}$ | $Tb_{20}(Fe_{90}Co_{10})_{80}$ |

COMPOSITION FOR GdTbFeCo

FIG. 3B

| LIGHT INCIDENT SIDE | OPPOSITE SIDE |
|---|---|
| $Gd_{25}(Fe_{80}Co_{20})_{75}$ | $Dy_{26}(Fe_{70}Co_{30})_{74}$ |

COMPOSITION FOR GdDyFeCo

FIG. 6A

| MARK LENGTH | 0.9 μm | 0.6 μm |
|---|---|---|
| WAVELENGTH 780 nm | 53.2 dB | 51.7 dB |
| WAVELENGTH 680 nm | 52.9 dB | 51.5 dB |

FIG. 6B

| MARK LENGTH | 0.9 μm | 0.6 μm |
|---|---|---|
| WAVELENGTH 780 nm | 52.8 dB | 51.1 dB |
| WAVELENGTH 680 nm | 52.4 dB | 50.9 dB |

FIG. 6C

| MARK LENGTH | 0.9 μm | 0.6 μm |
|---|---|---|
| WAVELENGTH 780 nm | 49.2 dB | 42.2 dB |
| WAVELENGTH 680 nm | 41.1 dB | 35.6 dB |

FIG. 6D

| MARK LENGTH | 0.9 μm | 0.6 μm |
|---|---|---|
| WAVELENGTH 780 nm | 49.7 dB | 44.3 dB |
| WAVELENGTH 680 nm | 46.2 dB | 40.2 dB |

FIG. 6E

| MARK LENGTH | 0.9 μm | 0.6 μm |
|---|---|---|
| WAVELENGTH 780 nm | 50.1 dB | 48.2 dB |
| WAVELENGTH 680 nm | 47.9 dB | 45.9 dB |

5,663,936

MAGNETO-OPTIC RECORDING MEDIUM SUITED FOR MARK EDGE RECORDING SYSTEM AND HAVING MAGNETIC LAYER MADE OF COMPOSITION MODULATED MATERIAL

This application is a continuation application of Ser. No. 08/222,946 filed Apr. 5, 1994, now abandoned.

BACKGROUND OF THE INVENTION

The present invention generally relates to magneto-optic recording mediums, and more particularly to a magneto-optic recording medium which is suited for the so-called mark edge recording system.

When recording information on a magneto-optic recording medium, marks of inverted magnetic domains are formed on the magneto-optic recording medium by use of a recording laser beam and an external magnetic field. In addition, when reproducing information from the magneto-optic recording medium, the recorded information is read with the use of a deflected reproducing laser beam and utilizes the magneto-optic effect.

Recently, due to the demands to improve the information recording density of the magneto-optic recording mediums, there have been demands to use a semiconductor laser which outputs a laser beam having a short wavelength as a light source of the recording laser beam and to employ the mark edge recording system.

Presently, the wavelength of the laser beam used for recording information on a magneto-optic disk is 780 nm or 830 nm. If the wavelength of the recording laser beam is set to the short wavelength, it is possible to make the recording marks formed on the magneto-optic disk small and accordingly, improve the recording density of the magneto-optic disk. Hence, a high density recording can be used with a laser beam which has a wavelength of approximately 680 nm and is about to be reduced to practice. However, the magneto-optic disk which is reduced to practice at present is made on the precondition that the recording laser beam used has a wavelength in a vicinity of 800 nm. For this reason, even if the wavelength of the recording laser beam is simply reduced to 680 nm, for example, there were problems in that the magneto-optic effect obtained will become small and that the quality of signals recorded on the magneto-optic disk will deteriorate.

According to the mark edge recording system, the edge of the recording mark formed on the magneto-optic disk corresponds to information (data) value "1". Hence, compared to the conventional so-called mark position recording system according to which the recording mark itself formed on the magneto-optic disk corresponds to the data value "1", the mark edge recording system can record the information on the magneto-optic disk with a higher density. It is conceivable to apply the mark edge recording system to the existing magneto-optic disk. However, no such magneto-optic disk has been reduced to practice at the present because of the need to realize a magneto-optic disk with reduced jitter and edge shift. The "jitter" refers to a positional deviation in the output waveform reproduced from the magneto-optic disk due to noise such as a medium noise of the magneto-optic disk. On the other hand, the "edge shift" refers to a positional deviation of the mark edge corresponding to the data value "1".

Various methods of improving the quality of signals recorded on the recording medium have been proposed, including the methods proposed in Japanese Laid-Open Patent Applications No. 57-78652 and No. 1-237945.

A thermomagnetic recording medium proposed in the Japanese Laid-Open Patent Application No. 57-78652 is provided with a high-coercivity layer having a low Curie point and a low-coercivity layer having a high Curie point. These two layers are commutatively coupled. The signal quality is improved according to this thermomagnetic recording medium.

On the other hand, a magneto-optic recording medium proposed in the Japanese Laid-Open Patent Application No. 1-237945 is provided with a high-coercivity layer made of a rare earth iron group amorphous alloy, and a low-coercivity layer made of a rare earth iron group alloy including light rare earth materials. These two layers are commutatively coupled. The signal quality is improved for the short wavelength according to this magneto-optic recording medium.

However, according to the methods proposed in the Japanese Laid-Open Patent Applications No. 57-78652 and No. 1-237945, a commutatively coupled layer structure is employed and an interface magnetic domain wall is generated between the layers. For this reason, differences are introduced between the sizes of the marks recorded in the two layers, and the positional accuracy of the marks which is essential in the case of the mark edge recording system is lost. As a result, the jitter and the edge shift are large according to these proposed methods, and there is a problem in that these proposed methods are unsuited for carrying out the mark edge recording using the short wavelength.

SUMMARY OF THE INVENTION

Accordingly, it is a general object of the present invention to provide a novel and useful magneto-optic recording medium in which the problems described above are eliminated.

Another and more specific object of the present invention is to provide a magneto-optic recording medium comprising a transparent substrate, a first dielectric layer provided above the transparent substrate, a magnetic layer provided above the first dielectric layer, a second dielectric layer provided above the magnetic layer, and a reflecting layer provided above the second dielectric layer, where the magnetic layer is made of a composition modulated material. According to the magneto-optic recording medium of the present invention, it is possible to guarantee the positional accuracy of the edge of the mark which is essential in the case of the mark edge recording system. A satisfactory magneto-optic effect can be obtained for recording laser beams of a relatively wide range of wavelengths from the long wavelength to the short wavelength. In addition, the jitter and the edge shift can be suppressed to small values.

Other objects and further features of the present invention will be apparent from the following detailed description when read in conjunction with the accompanying drawings.

BRIEF DESCRIPTION OF THE DRAWINGS

FIGS. 3A and 3B are diagrams showing compositions of a composition modulated magnetic layer on a light incident side and a side opposite therefrom;

FIGS. 6A, 6B, 6C, 6D and 6E are diagrams showing various measured results of the signal quality;

DESCRIPTION OF THE PREFERRED EMBODIMENTS

Figure 1:
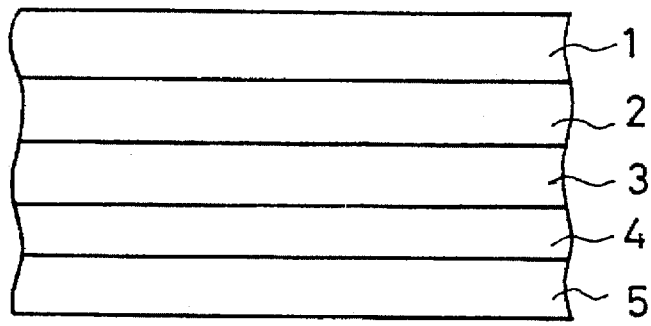
FIG. 1 is a cross sectional view showing an important part of a first embodiment of a magneto-optic recording medium according to the present invention.

FIG. 1 is a cross sectional view showing an important part of a first embodiment of a magneto-optic recording medium according to the present invention. In this embodiment, the present invention is applied to a magneto-optic disk.

A magneto-optic disk 10 shown in FIG. 1 includes a transparent substrate 1, a first dielectric layer 2, a composition modulated magnetic layer 3, a second dielectric layer 4, and a reflecting layer 5. In this embodiment, the transparent substrate 1 is made of polycarbonate (PC), and the first and second dielectric layers 2 and 4 are respectively made of $SiN_x$. The composition modulated magnetic layer 3 is made of GdTbFeCo. In addition, the reflecting layer 5 is made of Al. The reflecting layer 5 also functions as a heat radiation layer.

Figure 2:
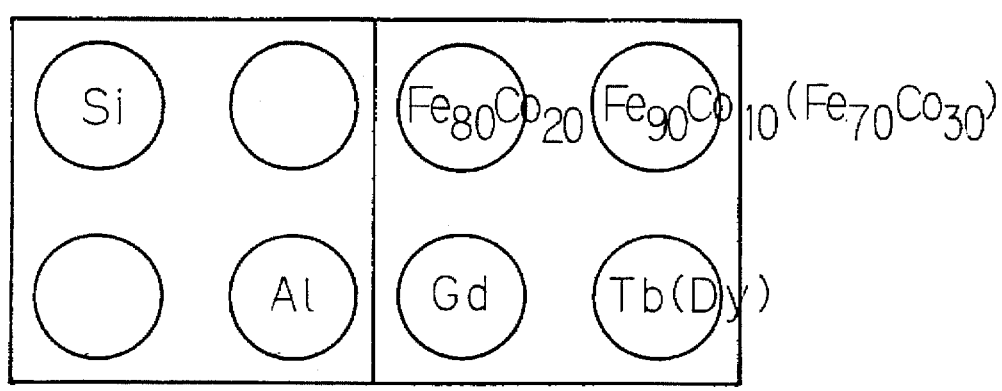
FIG. 2 is a plan view showing the arrangement of targets in a magnetron sputtering apparatus.

Next, a description will be given of a method of producing the magneto-optic disk 10. Each layer of the magneto-optic disk 10 is formed with the use of a magnetron sputtering apparatus, as shown in FIG. 2. The magnetron sputtering apparatus has a first chamber A and a second chamber B. Targets of Si and Al are placed in the first chamber A, while targets of Gd, Tb, $Fe_{80}Co_{20}$ and $Fe_{90}Co_{10}$ are placed in the second chamber B. The substrate 1 can move between the chambers A and B while maintaining the vacuum state of the chambers A and B.

The present inventors produced samples by using two kinds of substrate 1. A first substrate used as the substrate 1 was made of PC and had a diameter of 3.5 inches and a thickness of 1.2 mm. A sample was produced using this first substrate by use of a recording laser beam having a long wavelength of 780 nm. In addition, a sample was produced using this first substrate with the use of a recording laser beam having a short wavelength of 680 nm. On the other hand, a second substrate used as the substrate 1 was made of quartz glass. Samples were produced using this second substrate in order to measure the magneto-optic effect.

First, an Ar gas and a $N_2$ gas were introduced into the first chamber A, and a $SiN_x$ dielectric layer 2 was formed on the substrate 1 to a thickness of 75 nm at a gas pressure of 0.2 Pa. Next, the substrate 1 was moved to the second chamber B, and an Ar gas was introduced into the second chamber B. In this state, the gas pressure within the second chamber B was set to 0.5 Pa, the Gd target and the $Fe_{80}Co_{20}$ target were discharged, and the layer forming power was gradually decreased. Then, after a predetermined time, the Tb target and the $Fe_{90}Co_{10}$ target were discharged, and the layer forming power was gradually increased. As a result, the magnetic layer formed included a GdFeCo portion of 5 nm, a GdTbFeCo portion of 5 nm, and a TbFeCo portion of 15 nm. By employing such a layer forming method, the composition modulated magnetic layer 3 of the magneto-optic disk 10 finally obtained had a composition GdFeCo on a light (laser beam) incident side, a composition GdTbFeCo next thereto, and a composition TbFeCo on a side opposite from the light incident side.

FIG. 3A shows the composition of the composition modulated magnetic layer 3 on the light incident side and the side opposite from the light incident side. As described above, the composition of the composition modulated magnetic layer 3 differs in a direction in which the thickness of the composition modulated magnetic layer 3 is taken. However, the illustration of the compositions of the inner portions of the composition modulated magnetic layer 3 is omitted in FIG. 3A.

Next, the substrate 1 was returned to the first chamber A, an Ar gas and a $N_2$ gas were introduced into the first chamber A, and the $SiN_x$ dielectric layer 4 was formed on the composition modulated magnetic layer 3 to a thickness of 25 nm at a gas pressure of 0.2 Pa. In addition, an Ar gas was thereafter introduced into the first chamber A, and the Al reflecting layer 5 was formed on the dielectric layer 4 to a thickness of 45 nm at a gas pressure of 0.5 Pa. As a result, the magneto-optic disk 10 shown in FIG. 1 was obtained.

Two kinds of samples for measuring the magneto-optic effect were produced using the quartz glass substrate. One sample was produced by discharging a Gd target and a $Fe_{80}Co_{20}$ target at a constant power, so as to obtain a single-layered magnetic layer having a thickness of 30 nm. Another sample was produced by discharging a Tb target and a $Fe_{90}Co_{10}$ target at a constant power, so as to obtain a single-layered magnetic layer having a thickness of 30 nm.

Figure 4A:
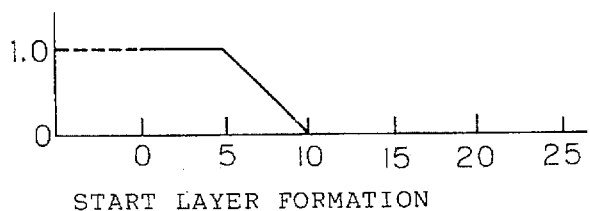
FIGS. 4A, 4B, 4C and 4D respectively are timing charts for explaining layer forming processes.
Figure 4B:
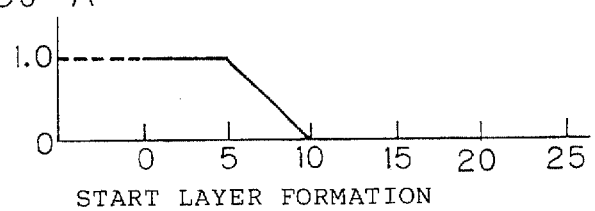
Figure 4C:
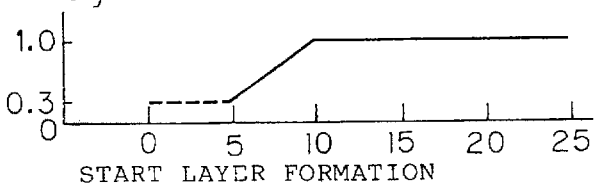
Figure 4D:
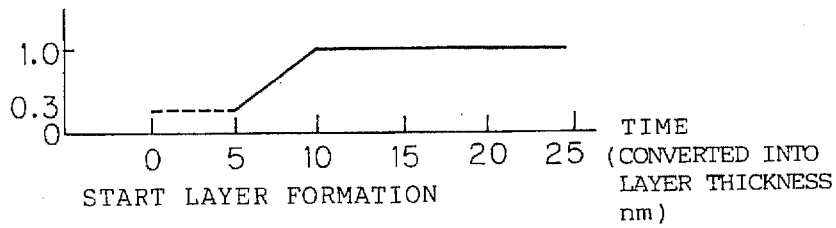

Accordingly, the layer forming process described above can be described by timing charts shown in FIGS. 4A through 4D. FIG. 4A shows the forming of Gd; FIG. 4B shows the forming of FeCo-A; FIG. 4C shows the forming of Tb (the forming of Dy in the case of a second embodiment which will be described later); and FIG. 4D shows the forming of FeCo-B. In FIGS. 4A through 4D, the ordinate indicates the layer forming power (kW), and the abscissa indicates the time converted into the layer thickness (nm). In addition, a portion indicated by the dotted line in FIGS. 4A through 4D indicates a preparation stage.

Figure 5:
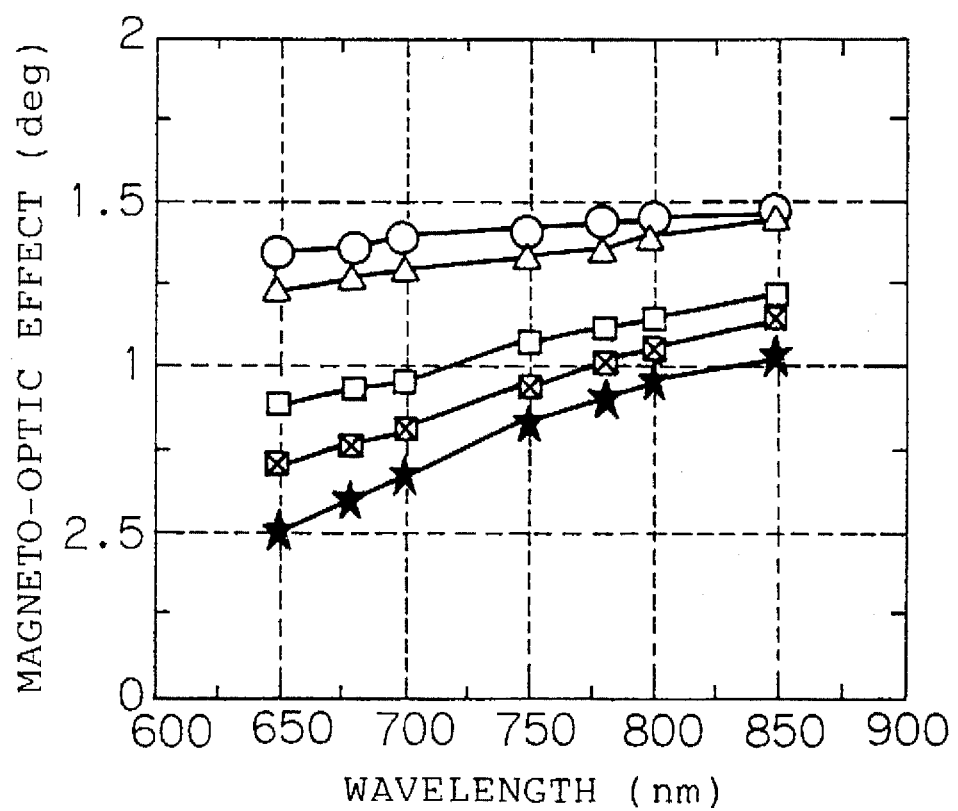
FIG. 5 is a diagram showing measured results of the wavelength dependency of the magneto-optic effect.

Next, a description will be given of the measured results of the wavelength dependency of the magneto-optic effect of the first embodiment, by referring to FIG. 5. In FIG. 5, the ordinate indicates the magneto-optic effect (deg), and the abscissa indicates the wavelength (nm). The wavelength dependency of this first embodiment is indicated by circular marks. For comparison purposes, the wavelength dependencies of four other magneto-optic disks are also shown in FIG. 5. Star-shaped marks in FIG. 5 shows the wavelength dependency of a magneto-optic disk (hereinafter simply referred to as a first conventional disk) which includes a PC substrate, a $SiN_x$ dielectric layer, a TbFeCo magnetic layer, a $SiN_x$ dielectric layer and Al as reflecting layer which are stacked in this order. Rectangular marks with an "x" in FIG. 5 shows the wavelength dependency of a magneto-optic disk (hereinafter, simply referred to as a second conventional disk) which includes a PC substrate, a $SiN_x$ dielectric layer, a NdFeCo magnetic layer, a TbFeCo magnetic layer and a $SiN_x$ dielectric layer which are stacked in this order. In addition, rectangular marks in FIG. 5 shows the wavelength dependency of a magneto-optic disk (hereinafter simply referred to as a third conventional disk) which includes a PC substrate, a $SiN_x$ dielectric layer, a NdFeCo magnetic layer, a TbFeCo magnetic layer, a $SiN_x$ dielectric layer and an Al reflecting layer which are stacked in this order. As may be seen from FIG. 5, the deterioration of the magneto-optic effect in this first embodiment is the smallest even for the short wavelength, and it was confirmed that a high magneto-optic effect can be obtained even for the short wavelength.

In FIG. 5, triangular marks shows the wavelength dependency of the second embodiment which will be described later.

Next, a description will be given of the measured results of the signal quality obtained in the first embodiment, by referring to FIGS. 6A through 6E. FIG. 6A shows the measured result of the first embodiment; FIG. 6B shows the measured results of the second embodiment which will be described later; FIG. 6C shows the measured results of the first conventional disk; FIG. 6D shows the measured results of the second conventional disk; and FIG. 6E shows the measured results of the third conventional disk. The measured results shown in FIGS. 6A through 6E were obtained by setting the peripheral velocity of the magneto-optic disk to 15 m/sec, setting the recording magnetic field to 300 Oe; forming fine recording patterns using two kinds of mark lengths which are 0.9 μm and 0.6 μm; and measuring the quality of the recorded signal for two cases where the laser beam has the long wavelength of 780 nm and the laser beam has the short wavelength of 680 nm. As may be seen from FIGS. 6A through 6E, the first embodiment can obtain an extremely high signal quality for both cases where the wavelength of the laser beam is long and the wavelength of the laser beam is short, when compared to the signal quality obtainable in the first, second and third conventional disks.

Figure 7A:
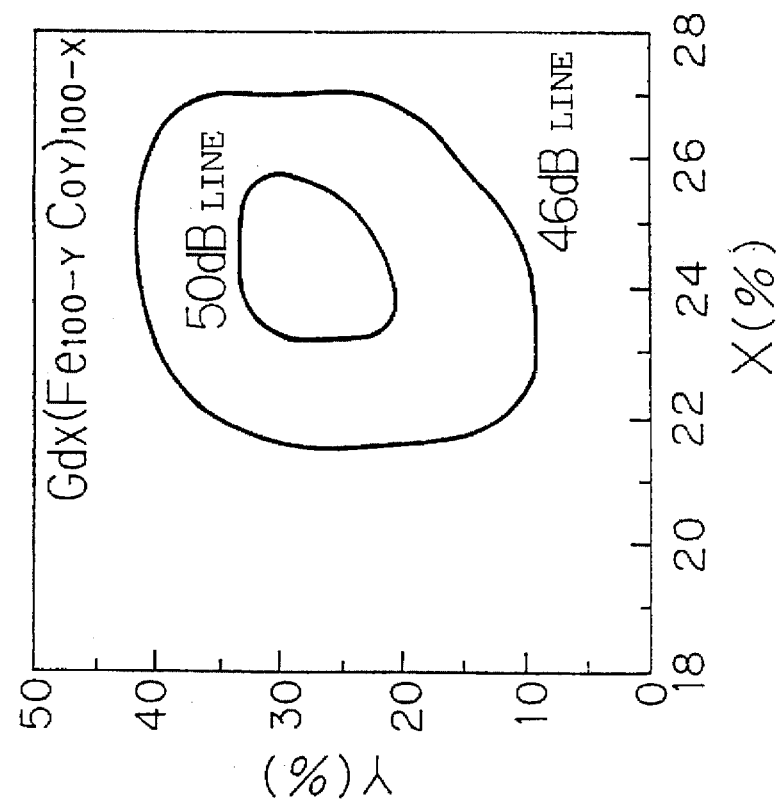
FIGS. 7A and 7B are diagrams showing various contour lines of the signal quality for different compositions of GdFeCo on the light incident side of the composition modulated magnetic layer.
Figure 7B:
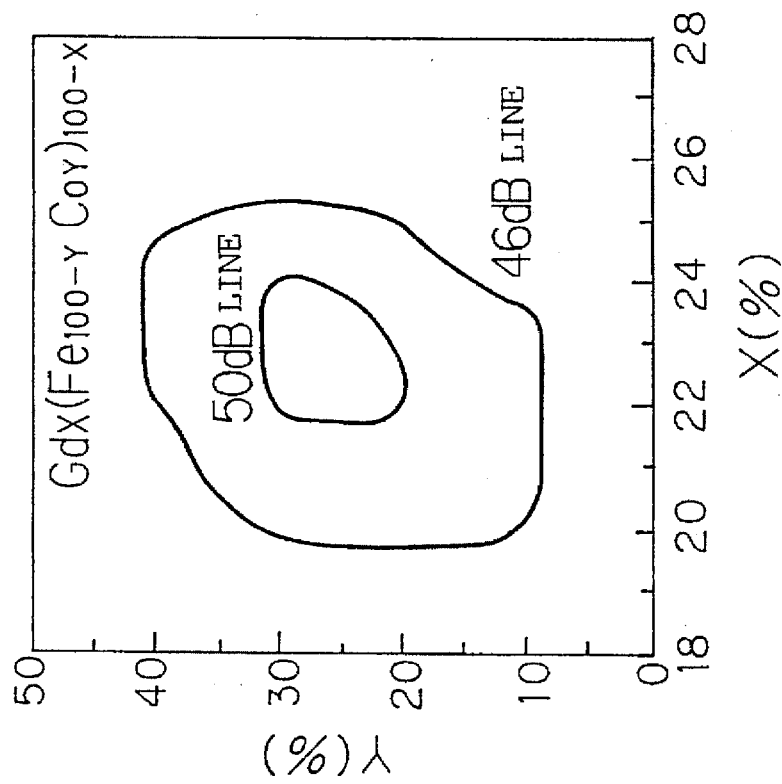

FIGS. 7A and 7B respectively show contour lines of the signal quality for different compositions of GdFeCo on the light incident side of the composition modulated magnetic layer 3. FIG. 7A shows the contour lines of the signal quality for the first embodiment where the composition of the composition modulated magnetic layer 3 is $Gd_X (Fe_{100-Y}Co_Y)_{100-X}$ on the light incident side and the composition is $Tb_{19}(Fe_{91}Co_9)_{81}$ to $Tb_{21}(Fe_{89}Co_{11})_{79}$. FIG. 7B shows the contour lines of the signal quality for the second embodiment where the composition of the composition modulated magnetic layer 3 is $Gd_X (Fe_{100-Y}Co_Y)_{100-X}$ on the light incident side and the composition is $Dy_{25}(Fe_{72}Co_{28})_{75}$ to $Dy_{27}(Fe_{68}Co_{32})_{73}$. The measured results shown in FIGS. 7A and 7B were obtained under the conditions where the peripheral velocity of the magneto-optic disk is 15 m/sec; the recording magnetic field is 300 Oe; the mark length is 0.6 μm; the track pitch is 1.2 μm; and the wavelength of the laser beam is 680 nm.

Next, a description will be given of the measured results of the edge shift and the jitter which are important factors in the mark edge recording system. It is desirable that both the edge shift and the jitter be small.

Figure 8A:
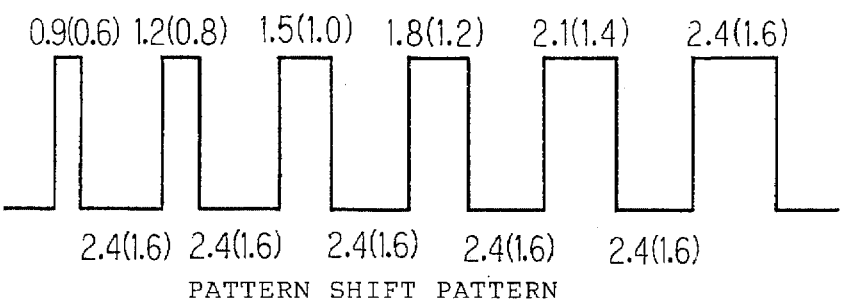
FIGS. 8A and 8B are diagrams showing various input waveforms used for measuring the edge shift and the jitter.
Figure 8B:
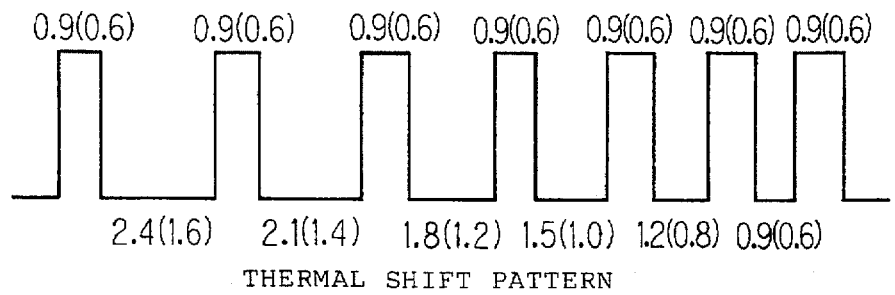

The edge shift and the jitter were measured using input waveforms shown in FIGS. 8A and 8B. FIG. 8A shows a pattern shift pattern which is used to observe the extent of the shift depending on the length of the recording mark. FIG. 8B shows a thermal shift pattern which is used to observe the extent of the shift depending on the length of the recording mark. For comparison purposes, the edge shift and the jitter were similarly measured for the third conventional disk which had a relatively high magneto-optic effect and signal quality compared to the first and second conventional disks. In FIGS. 8A and 8B, each numerical value without the bracket shows the length in μm for the case where the wavelength of the laser beam is 780 nm, and each numerical value in brackets shows the length in μm for the case where the wavelength of the laser beam is 680 nm.

The measured results shown in FIGS. 8A and 8B were obtained by setting the recording power to a power such that the shortest mark for the case where the pattern shift pattern is recorded matches the length of the input signal. In addition, the peripheral velocity of the magneto-optic disk was set to 15 m/sec, and the recording magnetic field was set to 300 Oe. Furthermore, when measuring the jitter, the jitter measurement at the leading edge of the mark and the jitter measurement at the trailing edge of the mark were made independently, and were made for each of the pattern shift pattern and the thermal shift pattern.

FIGS. 9A, 9B, 10A and 10B show the measured results of the edge shift. In FIGS. 9A, 9B, 10A and 10B, the circular marks indicate the measured results for the first embodiment, the triangular marks indicate the measured results for the second embodiment which will be described later, and the rectangular marks indicate the measured results for the third conventional disk.

Figure 9A:
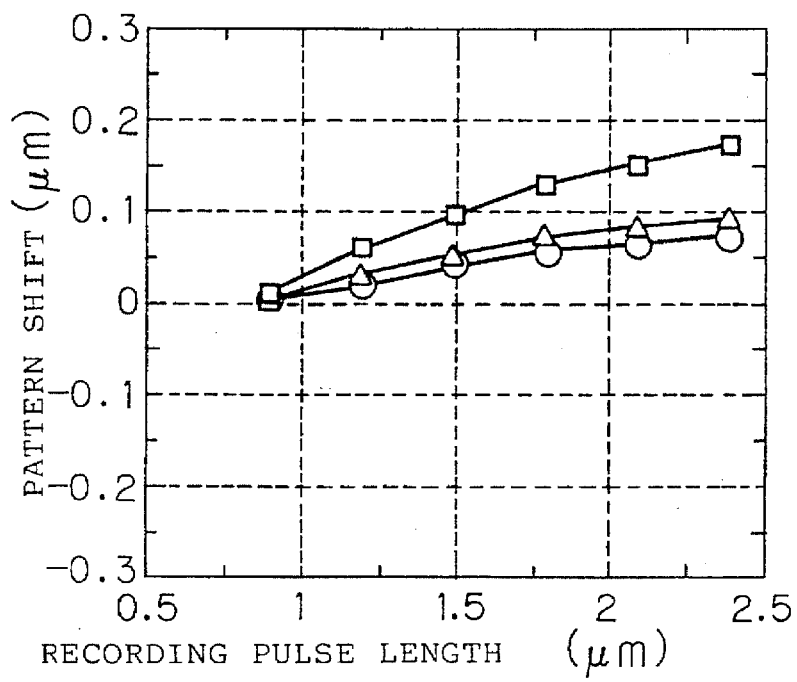
FIGS. 9A and 9B are diagrams showing various measured results of the edge shift when a pattern shift pattern is input.
Figure 9B:
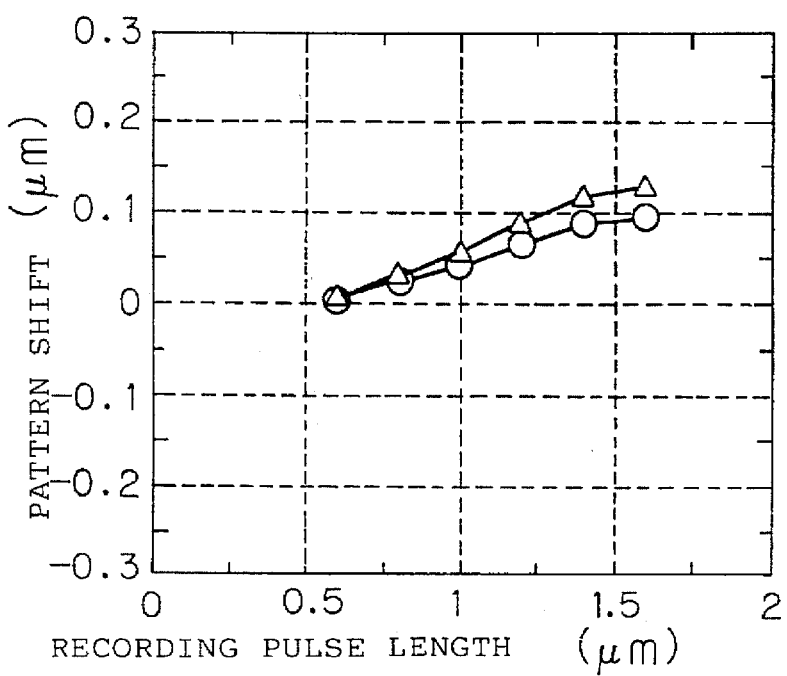

In FIGS. 9A and 9B, the ordinate indicates the pattern shift (μm) for the pattern shift pattern; and the abscissa indicates the recording pulse length (μm). FIG. 9A shows the pattern shift obtained when the wavelength of the laser beam is 780 nm; and FIG. 9B shows the pattern shift obtained when the wavelength of the laser beam is 680 nm.

Figure 10A:
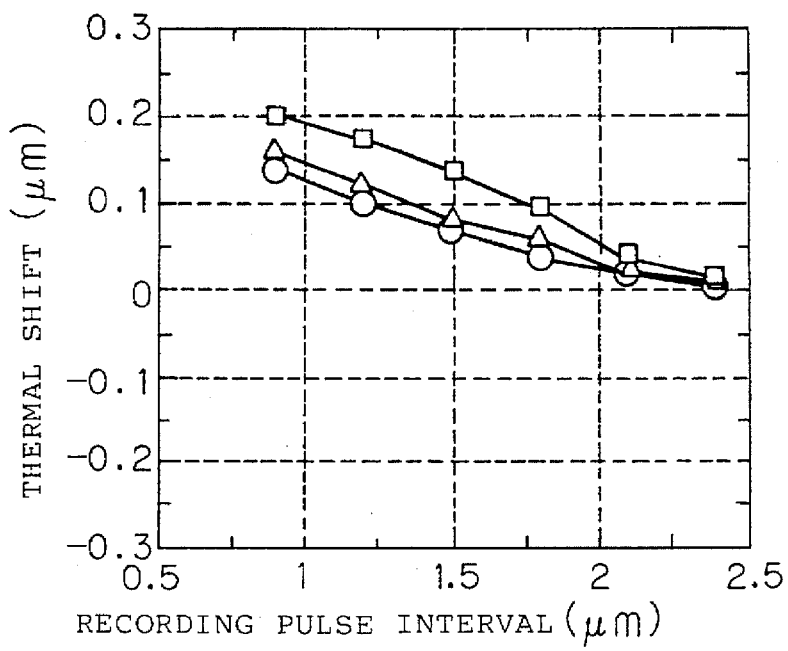
FIGS. 10A and 10B are diagrams showing various measured results of the edge shift when a thermal shift pattern is input.
Figure 10B:
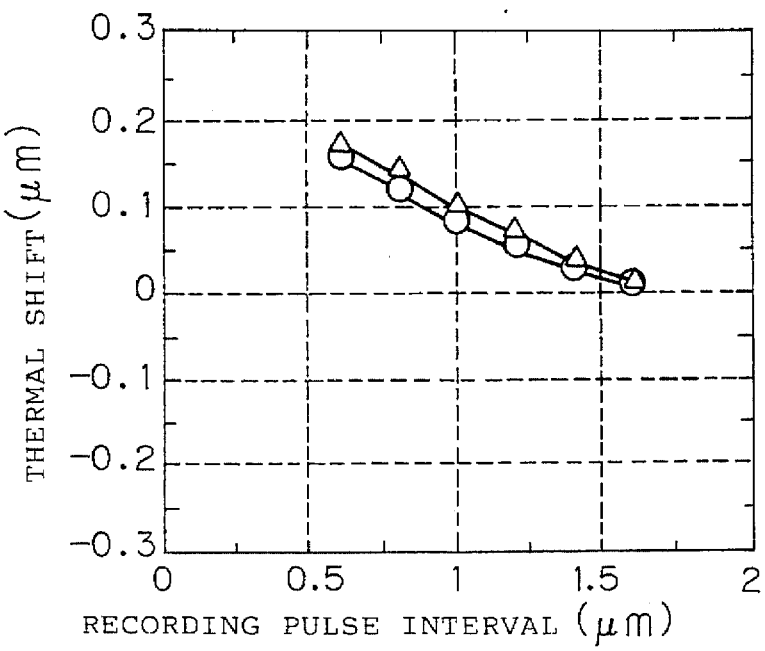

On the other hand, in FIGS. 10A and 10B, the ordinate indicates the thermal shift (μm) for the thermal shift pattern; and the abscissa indicates the recording pulse interval (μm). FIG. 10A shows the thermal shift obtained when the wavelength of the laser beam is 780 nm; and FIG. 10B shows the thermal shift obtained when the wavelength of the laser beam is 680 nm.

FIGS. 11A, 11B, 12A and 12B show the measured results of the jitter. In FIGS. 11A, 11B, 12A and 12B, the white circular marks indicate the measured results of the leading edge jitter for the first embodiment; the black circular marks indicate the measured results of the trailing edge jitter for the first embodiment, the white triangular marks indicate the measured results of the leading edge jitter for the second embodiment which will be described later; the black triangular marks indicate the measured results of the trailing edge jitter for the second embodiment; the white rectangular marks indicate the measured results of the leading edge jitter for the third conventional disk; and the black rectangular marks indicate the measured results of the trailing edge jitter for the third conventional disk.

Figure 11A:
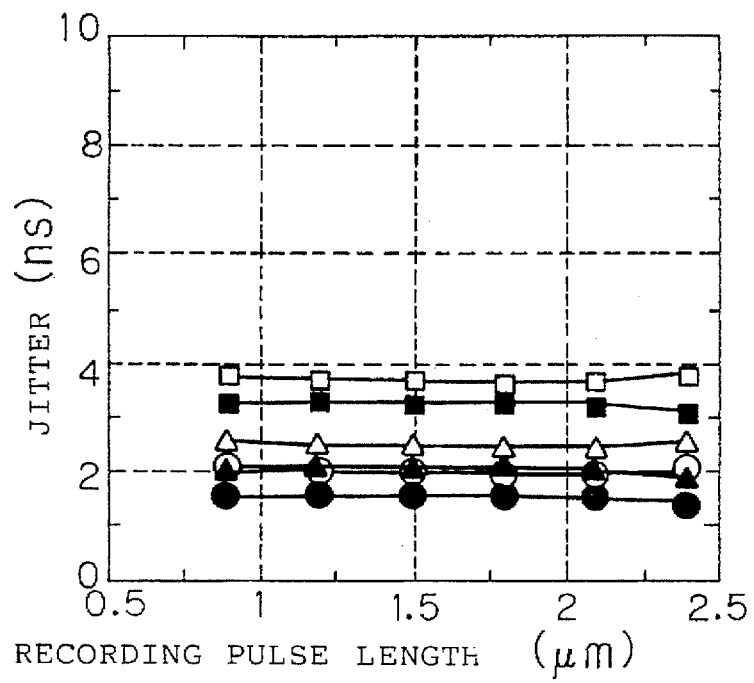
FIGS. 11A and 11B are diagrams showing various measured results of the jitter when the pattern shift pattern is input.
Figure 11B:
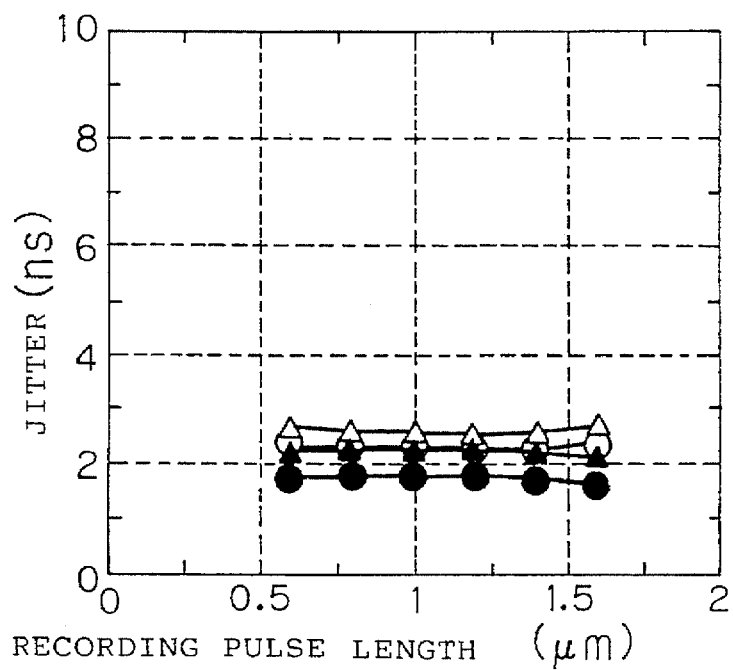

In FIGS. 11A and 11B, the ordinate indicates the jitter (nsec) for the pattern shift pattern; and the abscissa indicates the recording pulse length (μm). FIG. 11A shows the jitter obtained the when the wavelength of the laser beam is 780 nm; and FIG. 11B shows the jitter obtained when the wavelength of the laser beam is 680 nm.

Figure 12A:
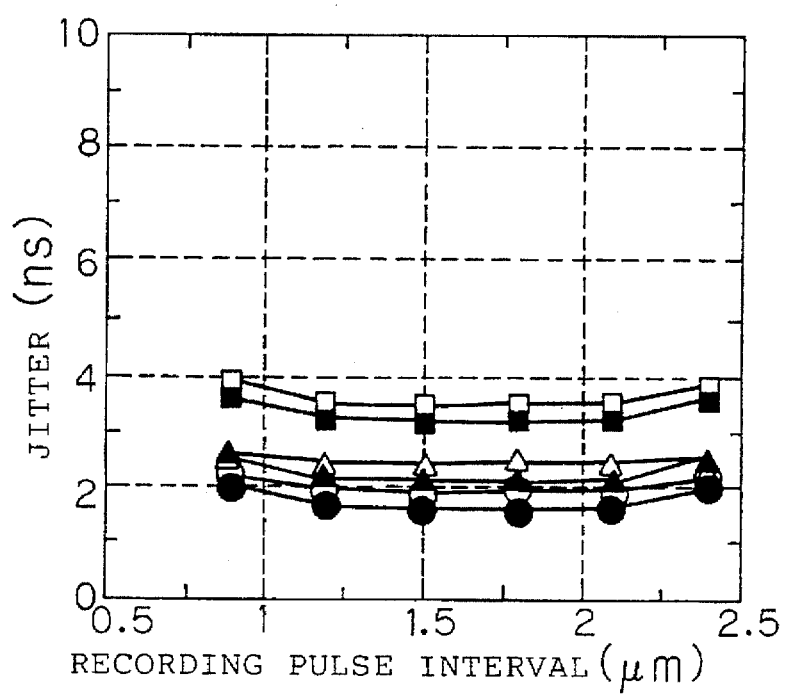
FIGS. 12A and 12B are diagrams showing various measured results of the jitter when the thermal shift pattern is input.
Figure 12B:
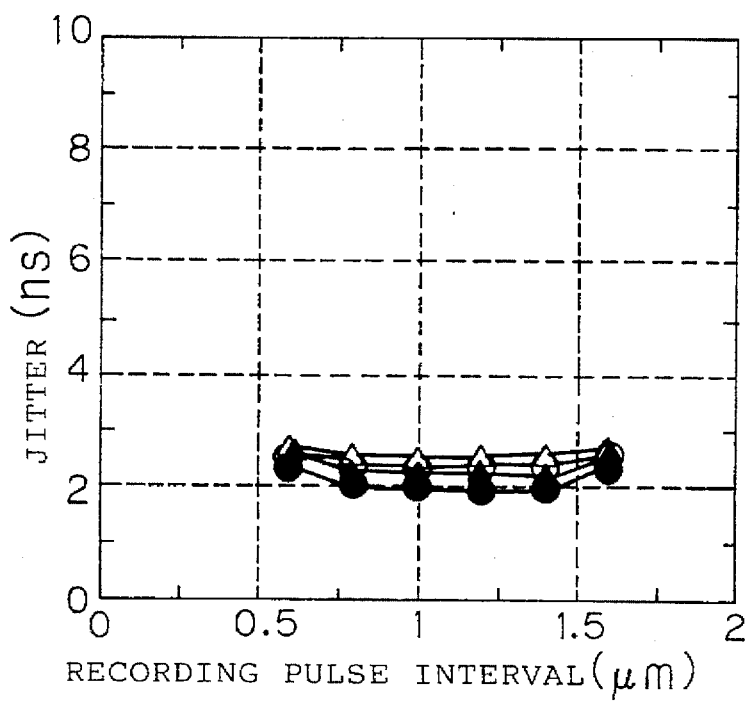

On the other hand, in FIGS. 12A and 12B, the ordinate indicates the jitter (nsec) for the thermal shift pattern; and the abscissa indicates the recording pulse interval (μm). FIG. 12A shows the jitter obtained when the wavelength of the laser beam is 780 nm; and FIG. 12B shows the jitter obtained when the wavelength of the laser beam is 680 nm.

In order to carry out the recording employing the mark edge recording system, the value of the jitter must be approximately 3 nsec or less. In this embodiment, it can be seen from the measured results of FIGS. 9 through 12 that the pattern shift, the thermal shift and the jitter are all extremely low compared to those of the third conventional disk for the case where the wavelength of the laser beam is 780 nm. In addition, similar results were obtained for the case where the wavelength of the laser beam is 680 nm.

Next, a description will be given of the second embodiment of the magneto-optic recording medium according to the present invention. The present invention is also applied to the magneto-optic disk in this second embodiment. The construction of this second embodiment is basically the same as that of the magneto-optic disk 10 shown in FIG. 1, except for the materials used for each of the layers; and an illustration of the construction of the second embodiment will be omitted. Instead, a reference will be made to FIG. 1 to explain the construction of the second embodiment.

In this second embodiment, the transparent substrate 1 of a magneto-optic disk 10A shown in FIG. 1 is made of PC, and the first and second dielectric layers 2 and 4 are respectively made of $SiN_x$. In addition, the composition modulated magnetic layer 3 is made of GdDyFeCo. Further, the reflecting layer 5 is made of Al. The reflecting layer 5 also functions as a heat radiating layer.

A description will now be given of a method of producing the magneto-optic disk 10A. Each of the layers of the magneto-optic disk 10A are formed using the magnetron sputtering apparatus shown in FIG. 2. In this case, targets of Si and Al are placed in the first chamber A shown in FIG. 2, and targets of Gd, Dy, $Fe_{80}Co_{20}$ and $Fe_{70}Co_{30}$ are placed in the second chamber B.

First, an Ar gas and a $N_2$ gas were introduced into the first chamber A, and a $SiN_x$ dielectric layer 2 was formed on the substrate 1 to a thickness of 75 nm at a gas pressure of 0.2 Pa. Next, the substrate 1 was moved to the second chamber B, the Gd target and the $Fe_{80}Co_{20}$ target were discharged, and the layer forming power was gradually decreased. Then, after a predetermined time, the Dy target and the $Fe_{70}Co_{30}$ target were discharged, and the layer forming power was gradually increased. As a result, the magnetic layer formed included a GdFeCo portion of 5 nm, a GdDyFeCo portion of 5 nm, and a DyFeCo portion of 15 nm. By employing such a layer forming method, the composition modulated magnetic layer 3 of the magneto-optic disk 10A finally obtained had a composition GdFeCo on the light (laser beam) incident side, a composition GdDyFeCo next thereto, and a composition DyFeCo on a side opposite from the light incident side.

FIG. 3B shows the composition of the composition modulated magnetic layer 3 on the light incident side and the side opposite from the light incident side. As described above, the composition of the composition modulated magnetic layer 3 differs in a direction in which the thickness of the composition modulated magnetic layer 3 is taken. However, the illustration of the compositions of the inner portions of the composition modulated magnetic layer 3 is omitted in FIG. 3B.

Next, the substrate was returned to the first chamber A, an Ar gas and a $N_2$ gas were introduced into the first chamber A, and the $SiN_x$ dielectric layer 4 was formed on the composition modulated magnetic layer 3 to a thickness of 25 nm at a gas pressure of 0.2 Pa. In addition, an Ar gas was thereafter introduced into the first chamber A, and the Al reflecting layer 5 was formed on the dielectric layer 4 to a thickness of 45 nm at a gas pressure of 0.5 Pa. As a result, the magneto-optic disk 10A shown in FIG. 1 was obtained.

Two kinds of samples for measuring the magneto-optic effect were produced using the quartz glass substrate. One sample was produced by discharging a Gd target and a $Fe_{80}Co_{20}$ target at a constant power, so as to obtain a single-layered magnetic layer having a thickness of 30 nm. Another sample was produced by discharging a Dy target and a $Fe_{70}Co_{30}$ target at a constant power, so as to obtain a single-layered magnetic layer having a thickness of 30 nm.

Accordingly, the layer forming process described above can be described by timing charts shown in FIGS. 4A through 4D as described above.

The measured results of the wavelength dependency of the magneto-optical effect of the second embodiment are shown in FIG. 5.

The measured results of the signal quality obtained in the second embodiment are shown in FIG. 6B.

The contour lines of the signal quality for different compositions of GdFeCo on the light incident side of the composition modulated-magnetic layer 3 are shown in FIG. 7B.

As can be seen from the measured results shown in FIGS. 9 through 12, the pattern shift, the thermal shift and the jitter in this second embodiment are all extremely low compared to those of the third conventional disk for the case where the wavelength of the laser beam is 780 nm, as in the first embodiment. In addition, similar results were obtained for the case where the wavelength of the laser beam is 680 nm as in to the first embodiment.

In each of the embodiment described above, the materials used for each of the layers are of course not limited to those of the embodiments. For example, the reflecting layer 5 is not limited to Al, and metals (such as, Au, Pt, Ag, Ta, Cu, W or the like or an alloy of arbitrarily selected ones of such metals) may be used for the reflecting layer 5.

As described above the magneto-optic recording medium according to the present invention can guarantee a high signal quality for the laser beam having the long wavelength to the laser having the short wavelength, and it may be regarded that this is made possible for the following reasons. That is the GdFeCO on the light incident side of the composition modulated magnetic layer cannot function as the recording layer by itself. However, this GdFeCo is characterized by the high magneto-optic effect with respect to the light having the long wavelength to the light having the short wavelength. On the other hand, the TbFeCo or DyFeCo on the opposite side from the light incident side of the composition modulated magnetic layer has a low magneto-optic effect with respect to the light having the short wavelength, but this TbFeCo or DyFeCO is characterized by the large perpendicular magnetic anisotropy. Therefore, it may be regarded that the high signal quality can be guaranteed by the magneto-optic recording medium according to the present invention for the laser beams having the long wavelength to the short wavelength because the composition modulated magnetic layer used in the present invention becomes a magnetic layer having both the advantageous characteristics described above. That is, the high magneto-optic effect and the large perpendicular magnetic anisotropy.

In addition, according to the present invention, the reflecting laser which also functions as the heat radiating layer is provided on the composition modulated magnetic layer via the dielectric layer. For this reason, it may be regarded that the signal quality became high because the so-called enhancement effect occurred and the effective magneto-optic effect became high. The "enhancement effect" refers to an overlap of the Kerr rotation angle of the light at the surface of the composition modulated magnetic layer and the Faraday rotation angle of the light which is transmitted through the composition modulated magnetic layer and reflected by the reflecting layer.

Moreover, it may be regarded that the jitter and the edge shift are low in the present invention because the composition modulated magnetic layer is used and not commutatively coupled layers, thereby generating no interface magnetic domain wall and enabling stable formation of the recording mark. In other words, it may be regarded that the jitter and the edge shift are low because the magnetic domain wall of the recording mark uneasily moves and the composition modulated magnetic layer functions as a stable magnetic layer with respect to the reproducing light. In addition, it may be regarded that, due to the reflecting layer also functioning as the heat radiating layer, the stability of the composition modulated magnetic layer or the like, with respect to the heat, increased due to the heat radiating effect, and resulted in the low jitter and edge shift.

It was confirmed from the measured results described above that, when the recording laser beam having the wavelength of 680 nm is used with respect to the magneto-optic disk according to the present invention to carry out the mark edge recording at a track pitch (groove pitch) of 1.2 μm and a minimum recording mark length of 0.6 μm, it is possible to realize a recording density of 500 MB or greater when the diameter of the magneto-optic disk is 3.5 inches and the MCAV recording system is employed.

Further, the present invention is not limited to these embodiments, but various variations and modifications may be made without departing from the scope of the present invention.

What is claimed is:

1. A magneto-optic recording medium, comprising:
   a transparent substrate;
   a first dielectric layer provided above said transparent substrate;
   a magnetic layer provided above said first dielectric layer;
   a second dielectric layer provided above said magnetic layer; and
   a reflecting layer provided above said second dielectric layer,
   said magnetic layer being made of a composition modulated material which is modulated in a direction in which a thickness thereof is taken so as to have at least a first composition on a light incident side of said magnetic layer, and a second composition on an opposite side from the light incident side, wherein said first and second compositions are different,
   said second dielectric layer and said reflecting layer causing an enhancement effect which is defined as an overlap of a Kerr rotation angle of light at a surface on the light incident side of said magnetic layer and a Faraday rotation angle of light which is transmitted through said magnetic layer and reflected by said reflecting layer.

2. The magneto-optic recording medium as claimed in claim 1, wherein the composition of said magnetic layer is modulated in a direction in which a thickness thereof is taken so that the composition is of said first composition of GdFeCo on said light incident side of said magnetic layer, is of a third composition of GdTbFeCo towards said direction opposite to the light incident side, and is of said second composition of TbFeCo on said opposite side from the light incident side.

3. The magneto-optic recording medium as claimed in claim 1, wherein the composition of said magnetic layer is modulated in a direction in which a thickness thereof is taken so that the composition is of said first composition of GdFeCo on said light incident side of said magnetic layer, is of a third composition of GdDyFeCo towards a direction opposite to the light incident side, and is of said second composition of DyFeCo on an opposite side from the light incident side.

4. The magneto-optic recording medium as claimed in claim 1, wherein said reflecting layer is made of a material selected from a group consisting of Al, Au, Pt, Ag, Ta, Cu, W and alloys of arbitrarily selected ones of such metals.

5. The magneto-optic recording medium as claimed in claim 4, wherein said reflecting layer also functions as a heat radiating layer.

6. The magneto-optic recording medium as claimed in claim 1, wherein said reflecting layer also functions as a heat radiating layer.

7. The magneto-optic recording medium as claimed in claim 1, wherein said magnetic layer has a thickness which permits light to transmit through said magnetic layer.

8. A magneto-optic recording medium, comprising:
   a transparent substrate;
   a first dielectric layer provided above said transparent substrate;
   a magnetic layer provided above said first dielectric layer;
   a second dielectric layer provided above said magnetic layer; and
   a reflecting layer provided above said second dielectric layer,
   said magnetic layer being made of a composition modulated material which is modulated in a specific direction in which a thickness thereof is taken so that a composition of said magnetic layer gradually changes along said specific direction,
   said composition modulated material having at least a first composition on a light incident side of said magnetic layer, and a second composition on an opposite side from the light incident side, wherein said first and second compositions are different,
   said second dielectric layer and said reflecting layer causing an enhancement effect which is defined as an overlap of a Kerr rotation angle of light at a surface on the light incident side of said magnetic layer and a Faraday rotation angle of light which is transmitted through said magnetic layer and reflected by said reflecting layer.

9. The magnetic-optic recording medium as claimed in claim 8, wherein said magnetic layer has a thickness which permits light to transmit through said magnetic layer.

10. A magneto-optic recording medium which records information in conformance with a mark edge recording system, said mark edge recording system recording the information so that an edge of a recording mark formed on the magneto-optic recording medium corresponds to data value "1", said magneto-optic recording medium comprising:

a transparent substrate;

a first dielectric layer provided above said transparent substrate;

a magnetic layer provided above said first dielectric layer;

a second dielectric layer provided above said magnetic layer; and a reflecting layer provided above said second dielectric layer, said magnetic layer being made of a composition modulated material which is modulated in a specific direction in which a thickness thereof is taken so that a composition of said magnetic layer gradually changes along said specific direction, said composition modulated material having at least a first composition on a light incident side of said magnetic layer, and a second composition on an opposite side from the light incident side, wherein said first and second compositions are different, said second dielectric layer and said reflecting layer causing an enhancement effect which is defined as an overlap of a Kerr rotation angle of light at a surface on the light incident side of said magnetic layer and a Faraday rotation angle of light which is transmitted through said magnetic layer and reflected by said reflecting layer.

11. The magneto-optic recording medium as claimed in claim 10, wherein said magnetic layer has a thickness which permits light to transmit through said magnetic layer.

* * * * *